United States Patent [19]

Fischer et al.

[11] Patent Number: 5,371,840
[45] Date of Patent: Dec. 6, 1994

[54] POLYGON TILING ENGINE

[75] Inventors: Douglas A. Fischer; Douglas E. Thorpe; Keith L. Jackson, all of Albuquerque, N. Mex.

[73] Assignee: Honeywell Inc., Minneapolis, Minn.

[21] Appl. No.: 231,347

[22] Filed: Apr. 21, 1994

Related U.S. Application Data

[63] Continuation of Ser. No. 914, Jan. 6, 1993, abandoned, which is a continuation-in-part of Ser. No. 514,724, Apr. 26, 1990.

[51] Int. Cl.5 .............................................. G06F 15/62
[52] U.S. Cl. ..................... 395/133; 395/141; 395/166
[58] Field of Search ................ 340/729, 747; 395/121, 395/123, 133, 141, 164, 166

[56] References Cited

U.S. PATENT DOCUMENTS

| | | | |
|---|---|---|---|
| 4,829,295 | 5/1989 | Hiroyuki | 340/747 X |
| 4,930,092 | 5/1990 | Reilly | 395/123 |
| 5,226,109 | 7/1993 | Dawson et al. | 395/141 X |

Primary Examiner—Mark K. Zimmerman
Attorney, Agent, or Firm—Craig J. Lervick

[57] ABSTRACT

A polygon tiling engine for use in a computer graphics display system. The computer graphics display system includes a high speed processor which provides lines of vertices, object type codes and START and STOP points for the vertex lines. The system further includes a VME bus. An improved apparatus for polygon tiling comprises apparatus for receiving the START and STOP points, instruction register apparatus coupled to the high speed processor for receiving instruction codes, object storing apparatus, a state machine for controlling the polygon tiling apparatus, a polygon address generating machine, a user defined object memory, a multiplexer and a triple buffered memory. Information is sent from the high speed processor to the tripled buffered memory, instruction registers and START and STOP registers. The information is processed into polygon addresses by the polygon generating apparatus. The polygon tiling apparatus is capable of tiling terrain data, multivertex polygons and user defined objects. The user defined objects are preferably stored in a link list random access memory. The state machine controls the polygon address generator and receives instructions from the instruction register. User information is supplied on the VME bus. Tiled polygons are output to a polygon sort engine for further processing.

5 Claims, 15 Drawing Sheets

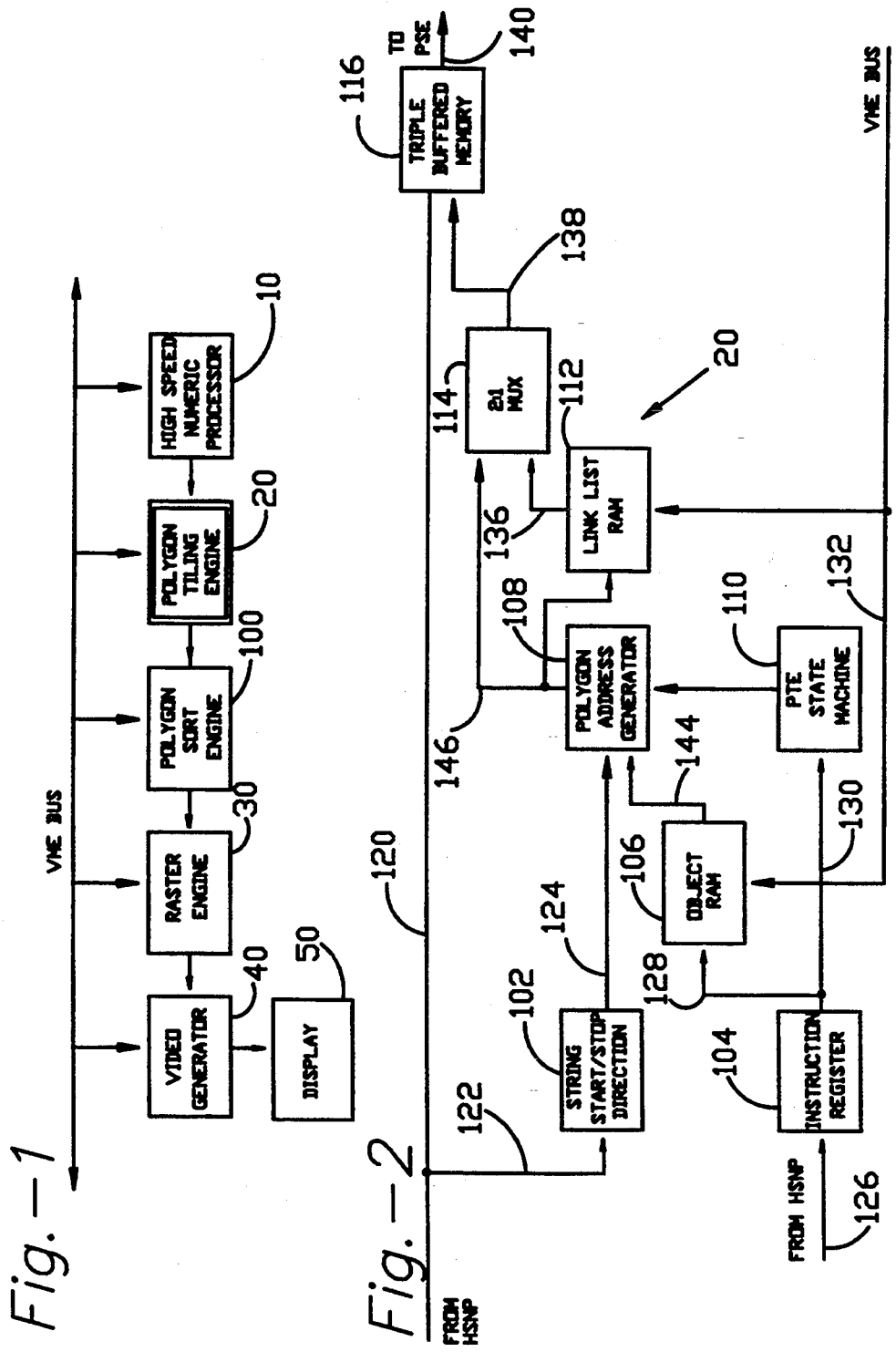

Fig.—14

POLYGON TILING ENGINE

This application is a continuation, of U.S. application Ser. No. 08/000,914, filed Jan. 6, 1993, now abandoned which was a continuation-in-part of U.S. application Ser. No. 07/514,724 filed Apr. 26, 1990.

FIELD OF THE INVENTION

The present invention is directed generally to computer generated graphic display systems and, more particularly, to an apparatus for generating polygons using a list of vertices and an object type code which are provided to another stage of a graphics pipeline.

RELATED APPLICATIONS

The following application are included herein by reference:

(1) U.S. Pat. No. 4,876,651 filed May 11, 1988, issued Oct. 24, 1989 entitled "Digital Map System" which was assigned to the assignee of the present invention;

(2) Assignee copending U.S. application Ser. No. 07/514,685 filed Apr. 26, 1990, entitled "High Speed Processor for Digital Signal Processing";

(3) U.S. Pat. No. 4,884,220 entitled "Generator with Variable Scan Patterns" filed Jun. 7, 1988, issued Nov. 28, 1989, which is assigned to the assignee of the present invention;

(4) U.S. Pat. No. 4,899,293 entitled "A Method of Storage and Retrieval of Digital Map Data Based Upon a Tessellated Geoid System", filed Dec. 14, 1988, issued Feb. 6, 1990;

(5) U.S. Pat. No. 5,020,014 entitled "Generic Interpolation Pipeline Processor", filed Feb. 7, 1989, issued May 28, 1991, which is assigned to the assignee of the present invention;

(6) Assignee's copending U.S. Pat. application Ser. No. 07/514,723 filed Apr. 26, 1990 entitled "Polygon Sort Engine".

BACKGROUND OF THE INVENTION

Images displayed by computer graphics are comprised of many small polygons of various shapes and sizes. Algorithms used to create a polygon using digital techniques are well known. However, they are generally implemented in software on a microprocessor. For real time applications, that is, situations where the display must be updated 20 times a second or more, the current state of the art is too slow. This is due to the fact that prior art devices depend primarily on software techniques and do not incorporate a viable hardware approach.

The present invention overcomes the disadvantages of the prior art by implementing a polygon tiling algorithm in electronic hardware, thereby allowing a much faster polygon tiling speed. The invention also provides a means to pipeline the polygon data so that a new polygon can be loaded into the hardware at the same time it is being tiled, and simultaneously as a tiled polygon is being provided as output information to a graphics rendering engine.

One method of generating three dimensional graphics initially generates three dimensional polygons which form the graphics. The process of generating such polygons is referred to as tiling. Tiling can occur in one of two places during the polygon rendering process in a graphic display system. In a first case, a set of points can be tiled and then transformed from world space into screen space. This approach has disadvantages in that a point may undergo transformation multiple times. Such an approach degrades the performance of the transformation unit, or may require a higher throughput from the transformation unit in order to meet system requirements. In a second approach, the points are tiled after transformation. This eliminates the disadvantage caused by the first method. When terrain is being transformed, as in the case of a digital map application, it is desirable to transform a string of data posts as one object in order to take advantage of algorithmic simplification and the transformation. In order to generate the polygons, two lines of objects of transformed points are required. It is desirable to use the polygon tiling engine in a system for more than just tiling terrain. Therefore, it must have the flexibility to handle objects of any kind, in order to keep the cost of the total system to a minimum. In a digital map system the polygon tiling engine is needed in order to generate three dimensional objects like terrain features or symbology.

SUMMARY OF THE INVENTION

FIG. 1 shows a block diagram of the major components of a high speed graphics display system. These include a means for display 50, a video generator means 40, a raster engine means 30, a polygon sort engine means 100, a polygon tiling engine means 20 and a high speed numeric processor means (HSNP) 10. The polygon tiling engine (PTE) 20 fits architecturally between the high speed numeric processor and the polygon sort engine. The PTE generates polygons using a list of vertices and an object type code. Each vertex consists of an X, Y screen location, a Z depth, an RGB color, and a K value wherein K is the translucency factor. For each line of vertices, the polygon tiling engine receives and stores all the vertices in a line of memory, records the start and stop address of the vertices in memory and further stores the object type represented by the line of vertices. Each line is either an object or, in the case of terrain, half of a series of objects. Vertices are received from the previous stage in a graphics pipeline, namely the high speed numerical processor.

The tiling section uses object type one of three ways. In the first case, if the object type is terrain, the tiling section uses two lines of memory to generate three vertex polygons or triangles of terrain. It uses the start and stop address of each line in forming the triangles. In the second case if the object type is one large polygon comprised of N vertices, the PTE simply passes the polygon on through to the output. In the third case, if the object type is a user defined object, the polygon tiling engine uses the object type code to obtain a start address in a logical mapping random access memory (RAM). The logical mapping RAM contains all the addresses for the line RA/4s in order to generate all the polygons in the object. The polygon tiling engine moves on to the next object when all the polygons have been tiled on a given line. The polygon tiling engine transmits the polygon onto the next stage of the rendering process, namely the polygon sort engine.

It is one object of the invention to provide a polygon tiling engine which can accommodate any number of objects with any number of vertices.

Another primary object of the invention is to provide a polygon tiling engine which can be implemented in a standard cell solution, thereby providing a polygon tiling engine capable of use in a graphics display pipeline with update requirements of 20 times per second or more.

One advantage of the present invention is that it provides a polygon tiling engine which is much faster than performing a similar algorithm in software on a microprocessor.

Other objects, features and advantages of the present invention will become apparent to those skilled in the art through the Description of the Preferred Embodiment, Claims, and drawings herein wherein like numerals refer to like elements.

BRIEF DESCRIPTION OF THE DRAWINGS

FIG. 1 is a block diagram of certain major components used in a high speed graphic display system including the polygon tiling engine of the invention.

FIG. 2 is a block diagram of the one example embodiment of the polygon tiling engine as provided by the instant invention.

DESCRIPTION OF THE PREFERRED EMBODIMENT

Figure 3:
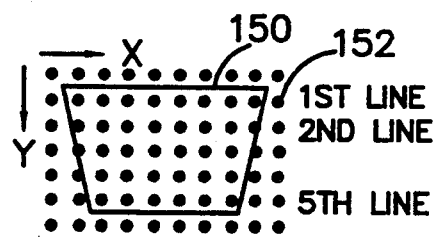
FIG. 3 schematically shows a view volume area of DTED posts as scanned by a HSNP.

Referring now to FIG. 2, a block diagram of one example embodiment of the polygon tiling engine as provided by the instant invention is shown. The polygon tiling engine comprises string START/STOP detection means 102, instruction register means 104, object storing means 106, PTE state machine means 110, polygon address generator means 108, link list RAM means 112, multiplexer means 114, and triple buffered memory means 116. The string START/STOP detection means 102 is connected by means of input line 122 to a first output of the HSNP. The string START/STOP detection means 102 provides an output on output line 124 to a first input of polygon address generator means 108. Instruction register means 104 accepts instruction inputs from a second output of the high speed numerical processor on line 126 and provides polygon tiling instruction outputs on lines 128 and 130. Object storing means 106 accepts outputs from instruction register means 104 on line 128 at a first input. Object storing means 106 may advantageously be a digital storage device such as a random access memory (RAM). A second input of object storing means 106 is tied via line 132 to the VME bus. The PTE state machine means 110 accepts outputs from the instruction register 104 on line 130. PTE state machine means 110 outputs state machine commands on line 142 to a first input of the polygon address generator 108. The second input of the polygon address generator accepts data from the string START/STOP detection means 102 on line 124, while a third input of the polygon address generator 108 receives data on line 144 from the output of the object storing means 106. The polygon address generator has an output on line 146. The output on line 146 is presented to a first input of link list RAM 112. The second input of link list RAM 112 is connected to the VME bus. The output of link list RAM 112 is presented on line 136 to a first input of multiplexer means 114. Multiplexer means 114 is preferably a 2-to-1 multiplexer. A second input of multiplexer means 114 is connected to line 146 for accepting data from the polygon address generator. The multiplexer means 114 has an output on line 138 to a first input of triple buffered memory 116. A second input of triple buffered memory 116 is connected to line 120. The triple buffered memory 116 has an output on line 140.

Those skilled in the art will recognize that the input and output lines connecting the various circuit blocks of the invention are merely representative of data flow and are shown in schematic form. Each line may typically represent a plurality of conductors, data busses or other connection means. Further, note that the various registers, RAMs and multiplexers may be individually comprised of conventional components which are commercially available. Those circuit blocks which are custom designed in accordance with the teachings of the invention are described herein in detail.

In operation, the polygon tiler engine receives transformed DTED posts from the HSNP and converts the points representative of DTED posts to polygons. The PTE receives the transformed X' Y' address, the Z' depth and the R' G' B' and K' values of each point The PTE also receives on line 122 a START and STOP bit for each line of points which it receives, and a data valid bit, DATAVALID, and four instruction, SYMBOL, bits on line 126. The instruction bits, SYMBOL, determine what type of data is being presented by the HSNP. In the illustrative embodiment of the invention described herein, the PTE can process three types of data namely, terrain data, N vertex polygons and user defined objects. Instruction 0 is representative of terrain data. Instruction 1 is representative of an N vertex polygon. Instructions 2–15 are user defined objects. In one example of the polygon tiling engine provided by the present invention, there are two restrictions imposed upon the output polygons, namely they must be externally convex and planar. The PTE processes the three types of data in the manner as described hereinbelow.

TERRAIN DATA

Figure 4:
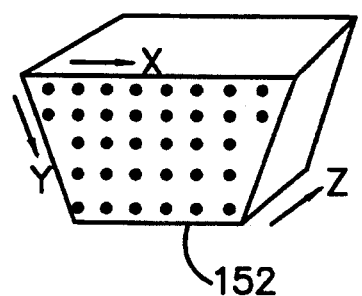
FIG. 4 conceptually shows an illustration of X', Y' location and Z depth of DTED points.

The HSNP takes the plan view DTED data and scans out a view volume area generally in the shape of a trapezoid typically covering a mapping area six miles deep by two miles wide of DTED data posts. This typically amounts to a number of triangles to be processed in the range of about 2000 to 8000. For texture map applications, the number of triangles processed may be up to about 100,000. The HSNP is described in detail in assignee's co-pending application referenced hereinabove entitled HIGH SPEED PROCESSOR FOR DIGITAL SIGNAL PROCESSING. The HSNP takes the elevation data of each post and computes an RGB value for it according to its depth and elevation from the viewer. The point is shaded for sun-angle by computing the surface normal on the fly in a well-known manner. The PTE then receives the RGB and K value of each DTED point along with its X', Y' location and Z depth The X', Y', Z', R', G', B', K information is stored one line at a time in one of three banks of 4K by 68 RAM, for example. The lines of data posts are shown in FIG. 3. The X', Y' and Z data points are shown in FIG. 4. DTED posts are shown generally as dots 152.

Figure 5:
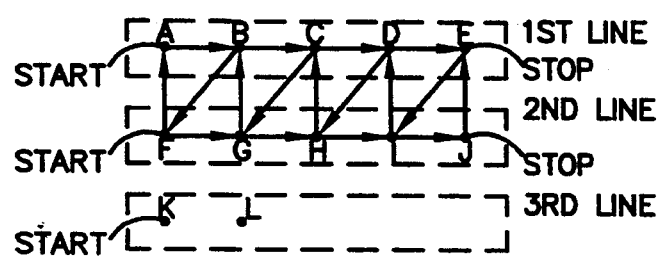
FIG. 5 shows an example of terrain tiling as provided by the present invention.

After two lines of data, for example, the first and second lines for FIG. 3, have been received, the PTE begins to transform the points into polygons while the HSNP puts the third line into memory. When the PTE finishes its transformation, it can create polygons for the next two lines while the HSNP overwrites the first line with the next line of data. There is a START and STOP control bit for each line of data. The PTE will always tile terrain in this same fashion. This prevents screen scintillation or "boiling" which may result from different tiling approaches on the same terrain data at different times. An example of the tiling method followed by the polygon tiling engine is shown in FIG. 5. The tiler transforms the points A–J into polygons while the high speed numerical processor fills the third line including points K and L into the storage memory. The start point for line 1 is A, and the start point for line 2 is F. The stop points are E and J. The start point for the third line is K. As shown in FIG. 5, the polygon tiling engine begins at the start point of the second line and progresses in a repeating pattern from F to A, A to B, B to F, F to G, G to B, etc. until the stop points are tiled in.

TILING OF N VERTEX POLYGONS

Figure 6:
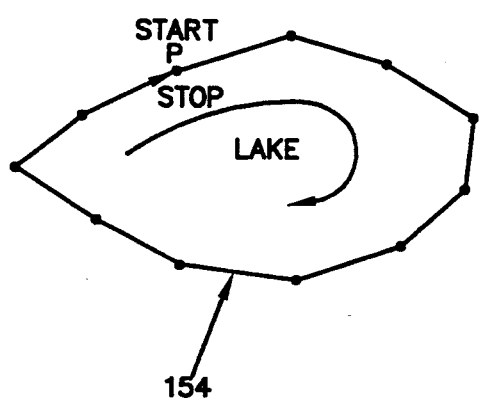
FIG. 6 shows an example of an N vertex polygon as processed by the present invention.

In the illustrative example of the invention described herein, instruction i is reserved for designating an N vertex polygon. An N vertex polygon may be a geographical feature such as a lake as exemplified in FIG. 6. Such an N vertex polygon is simply passed through the PTE to the polygon sorter engine because it is assumed that each point is connected to the next point and that the first and last points are connected together (shown as START and STOP point P in FIG. 6). These N vertex polygons are treated as special cases. Typical values for features such as the lake illustrated in FIG. 6 are around 1,000 vertexs. In one example embodiment of the invention, N can be as large as 4,000.

USER DEFINED OBJECTS

Figure 7:
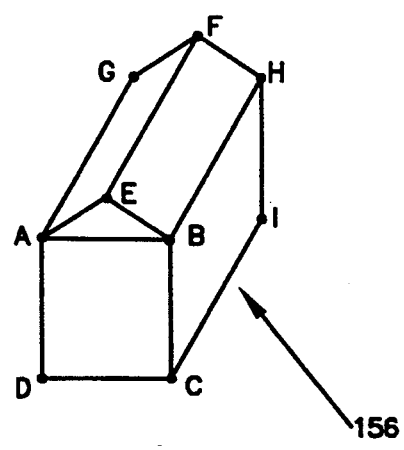
FIG. 7 shows an example of a user defined object as processed by the present invention.

Objects such as houses, tanks, bridges and other special objects are defined by the user. The faces of the objects are already broken down into polygons and are stored in the link list RAM 112. FIG. 7 shows an example of a user defined polygon as building 156 comprised of vertexs A-I.

Figure 8:
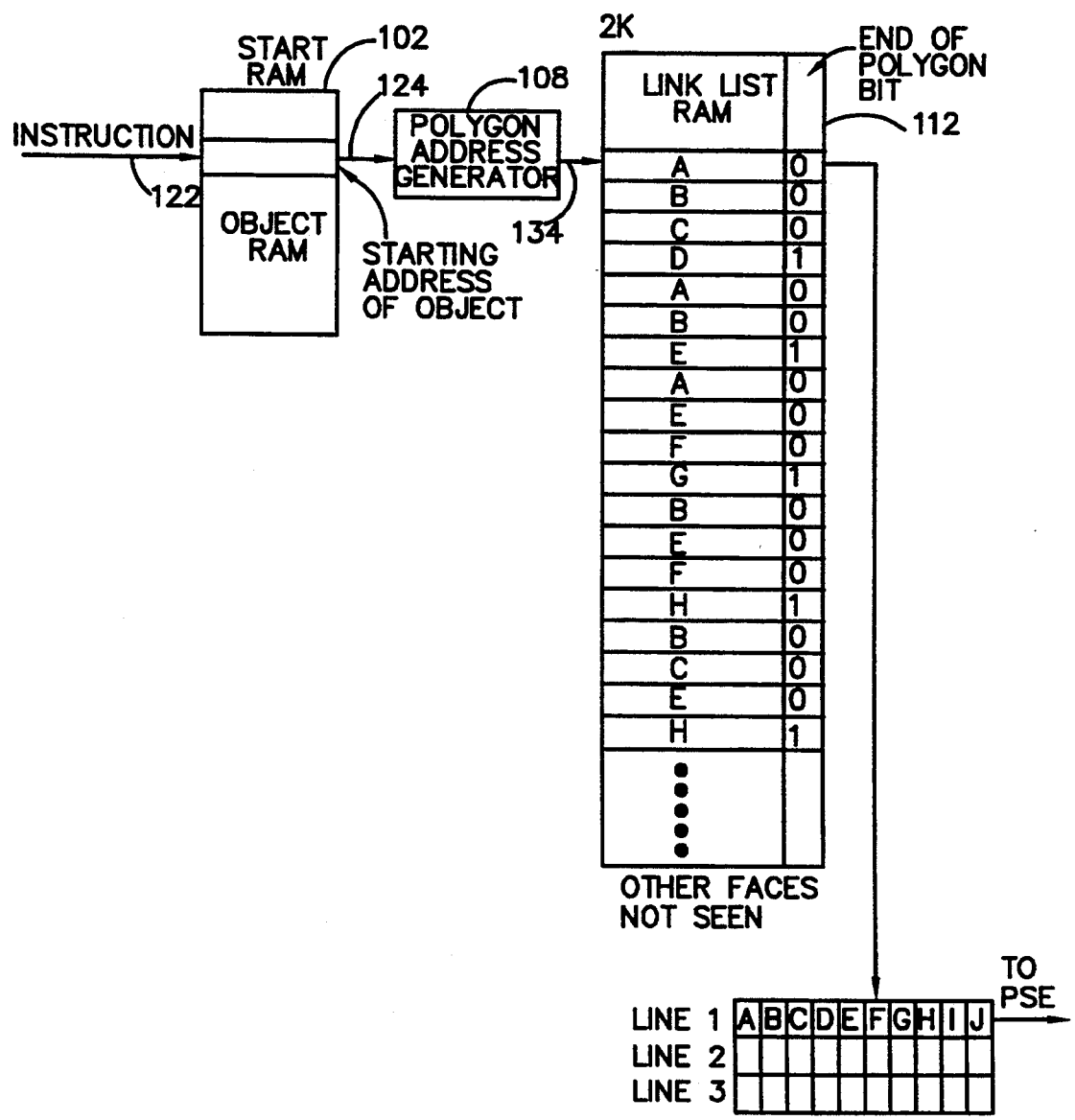
FIG. 8 illustrates the apparatus employed in one embodiment of the invention to tile a user defined object.

Referring now to FIG. 8 with continuing reference to FIG. 7, the apparatus employed in one embodiment of the invention to tile a user defined object is shown. As the instruction value comes across the instruction points from the object RAM 106 through the polygon address generator 108, to the starting address of the object in the link list RAM, the output of the RAM addressing the stored data in the line of stored points outputs the data in polygon form. The column in link list RAM 112 denoted as "End Of Polygon Bit" is set to binary 1 at the end of each polygon face. Therefore, for example, polygon ABCD ends at point D, polygon ABE ends at point E, etc. Data shown in line 1, line 2 and line 3 is sent to the PSE as 64 bit transformed data in the illustrative example described herein.

TRIPLE BUFFERED MEMORY

Figure 9:
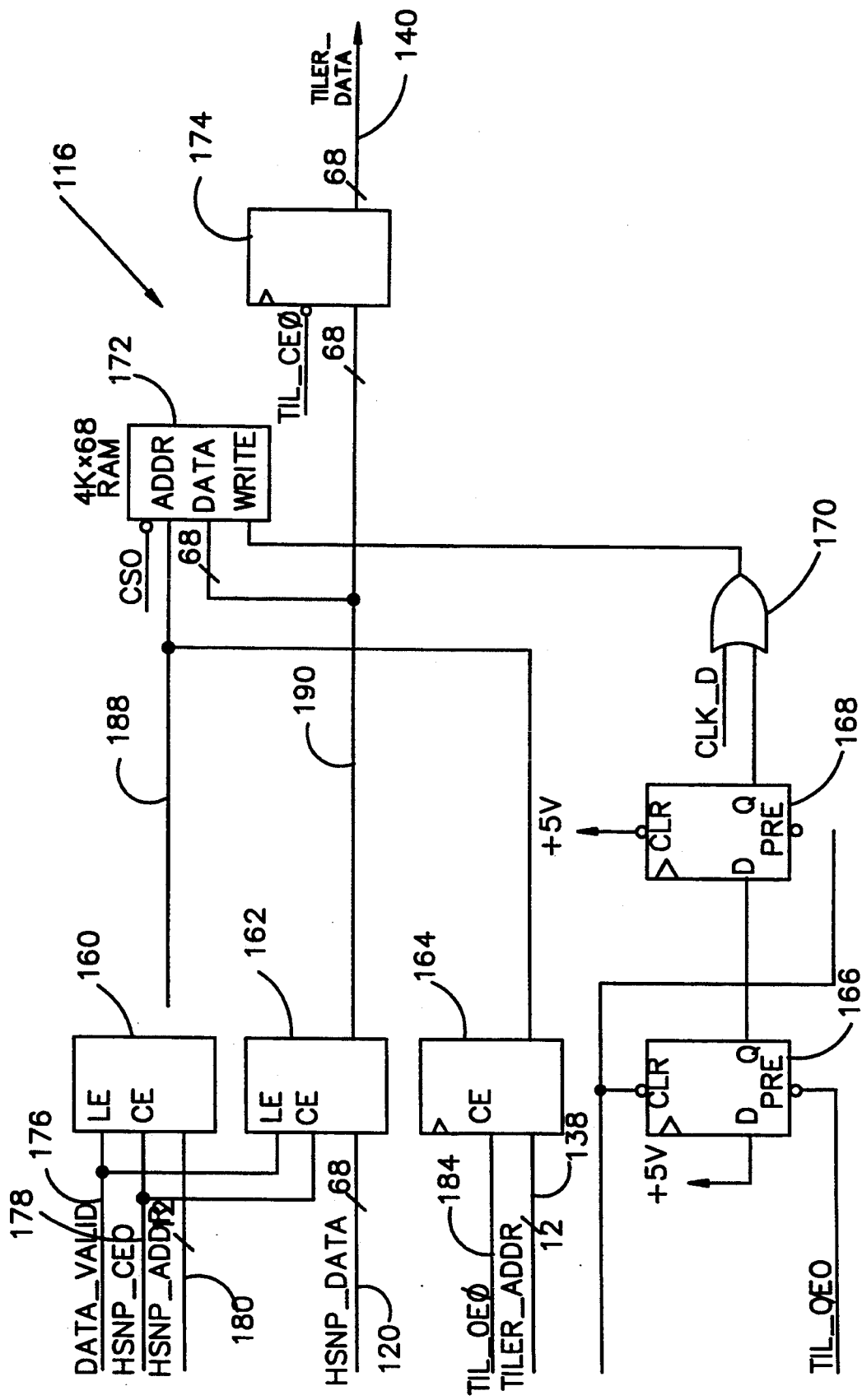
FIG. 9 is a block diagram which schematically illustrates one section of the triple buffered memory employed in one embodiment of the invention.

Referring now to FIG. 9, a block diagram illustrating one section of the triple buffered memory 116 employed in one embodiment of the invention is shown. It is to be understood that the circuit shown in FIG. 9 is to be replicated three times within triple buffered memory means 116. Each section of the triple buffered memory means 116 includes first through sixth registers 160, 162, 164, 166, 168, and 174, ORgate 170 and RAM 172. The DATAVALID signal is presented to register 160 and register 162 at their LE inputs from line 176. The OE inputs of registers 160 and 162 are tied by line 178 to the signal HSNPCE0. A data input of register 160 accepts a HSNPADDR which, in this example of the invention, is a 12 bit data line 180. Register 162 has a data input on line 120 which accepts HSNPDATA on a 68 bit input line. Register 164 has an OE input tied by line 184 to signal TILOE0. The register 164 further has a line 186 tied to the tiler address data, TILERADDR, having a 12-bit input in this example. The outputs of registers 160 and 164 merge on line 188 and are presented to RAM 172 at its ADDR input. The output of register 162 is presented from node 190 as a 68 bit data input to RAM 172 and a 68 bit data input to register 174, in this example. Registers 166 and 168 and ORgate 170 are configured so as to provide a write enable signal to RAM 172 on line 175. Register 174 outputs tiler data on line 140 to the polygon sort engine downstream. The small graphs beneath register 174 show the typical data valid signal timing together with the address data window. In the example shown, using a 16 MHz system clock having a 62 nsec cycle, the tiler address data is output to the RAM 172 in about 10 nsec.

START/STOP REGISTERS

Figure 10:
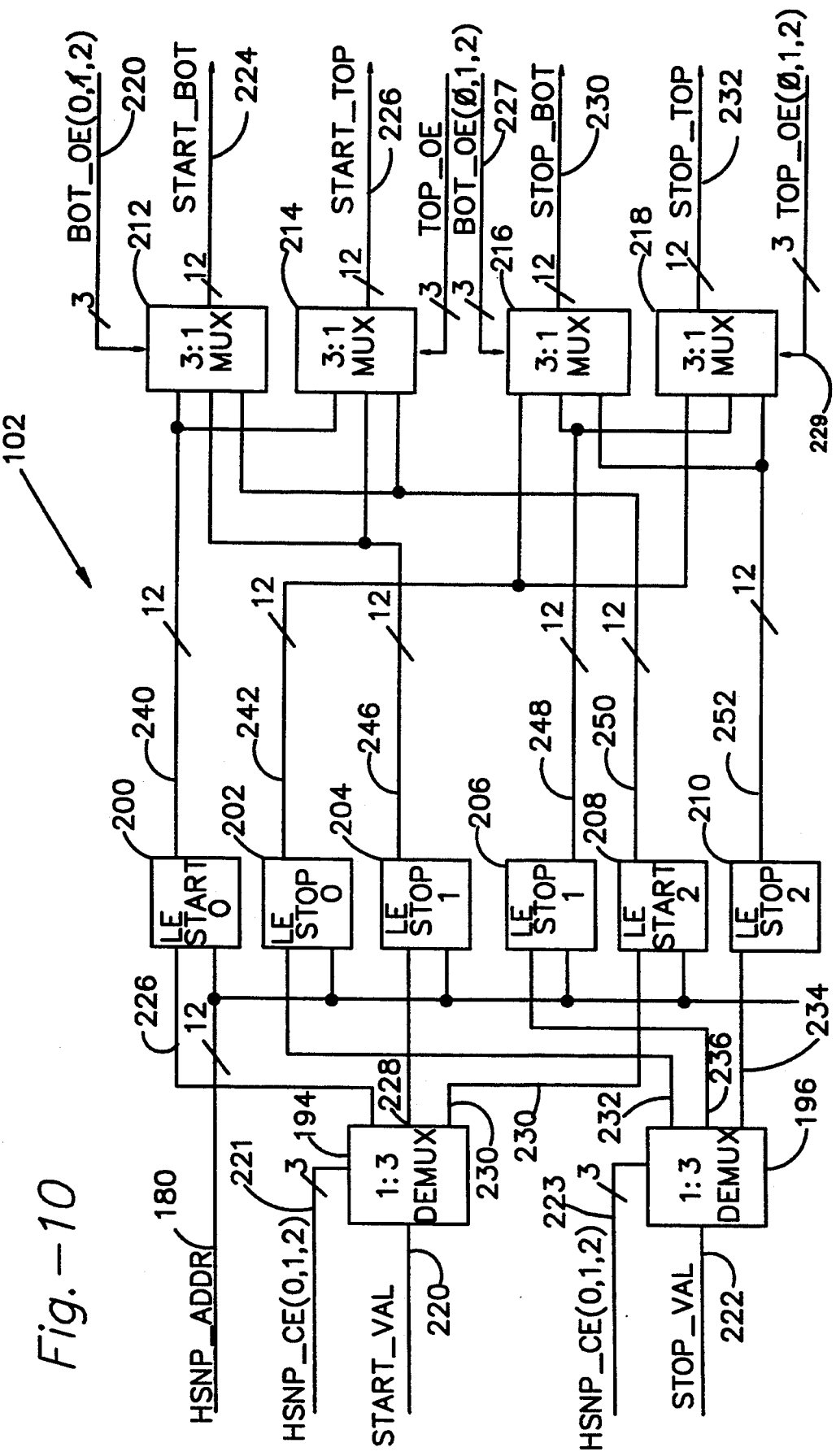
FIG. 10 is a block diagram which schematically illustrates the START/STOP address registers employed in one embodiment of the invention.

Now referring to FIG. 10, a circuit diagram of the START/STOP detection means 102 of the polygon tiling engine of the invention is shown. The START/-

STOP address register section includes first and second demultiplexers 194 and 196, first through sixth registers 200, 202, 204, 206, 208 and 210, and first through fourth multiplexers 212, 214, 216 and 218.

First demultiplexer 194 accepts signal STARTVAL on line 220 as an input. Second demultiplexer 196 accepts signal STOPVAL as an input from line 222. First demultiplexer 194 also accepts an enable code HSNPCE (0,1,2,) on line 221 which is typically a three bit enable code. Similarly demultiplexer 196 accepts enable signal HSNPCE(0,1,2) line 223 which is also preferably a three bit code. Second demultiplexer 194 and 196 are preferably one to three demultiplexer devices. First demultiplexer 194 has first, second and third outputs 226, 228 and 230, which are routed to the LE inputs of registers 200, 204 and 208 wherein registers 200, 204 and 208 comprise the START registers. Demultiplexer 196 has first, second and third outputs which are similarly routed to registers 202, 206 and 210 which comprise the STOP registers. The data inputs of each of the registers are tied to line 180 which carries the HSNPADDR address data to their respective data inputs. In the example embodiment, this is preferably a 12 bit address data line. Each of the registers has output lines 240, 242, 246, 248, 250 and 252, respectively. Output line 240 is provided to a first input of multiplexer 212 and 214. Output line 242 is provided to first inputs of multiplexers 216 and 218. Output line 246 is provided to second inputs of multiplexers 214 and 212. Output line 248 is provided to second inputs of multiplexers 216 and 218. Output line 250 is provided to a third input of multiplexers 212 and 214 and output 252 is provided to a third input of multiplexer 216 and 218. Multiplexer 212 further accepts a BOTOE(0,1,2) enable signal on line 220 while multiplexer 214 accepts a TOPOE enable signal on line 222. The first through 4th multiplexers are preferably 3-to-1 multiplexers. Multiplexer 212 and 214 provide the start signals for the top and bottom of the line on output lines 224 and 226, respectively, which carry signals STARTBOT and STARTTOP. Similarly, multiplexer 216 and 218 comprise the STOP multiplexers to signal the stopping points for the bottom and top lines of vertexes. Multiplexer 216 accepts a 3-bit enable signal BOTOE(0,1,2) on line 227 while multiplexer 218 accepts enable signal TOPOEST on line 229. Multiplexer 216 provides output signal STOPBOT on line 230. Multiplexer 218 provides output signal STOPTOP on line 232. The signal STOPBOT signals the STOP address for the bottom line of vertexes. STOPTOP is the stop signal for the top line of vertexes.

Figure 11:
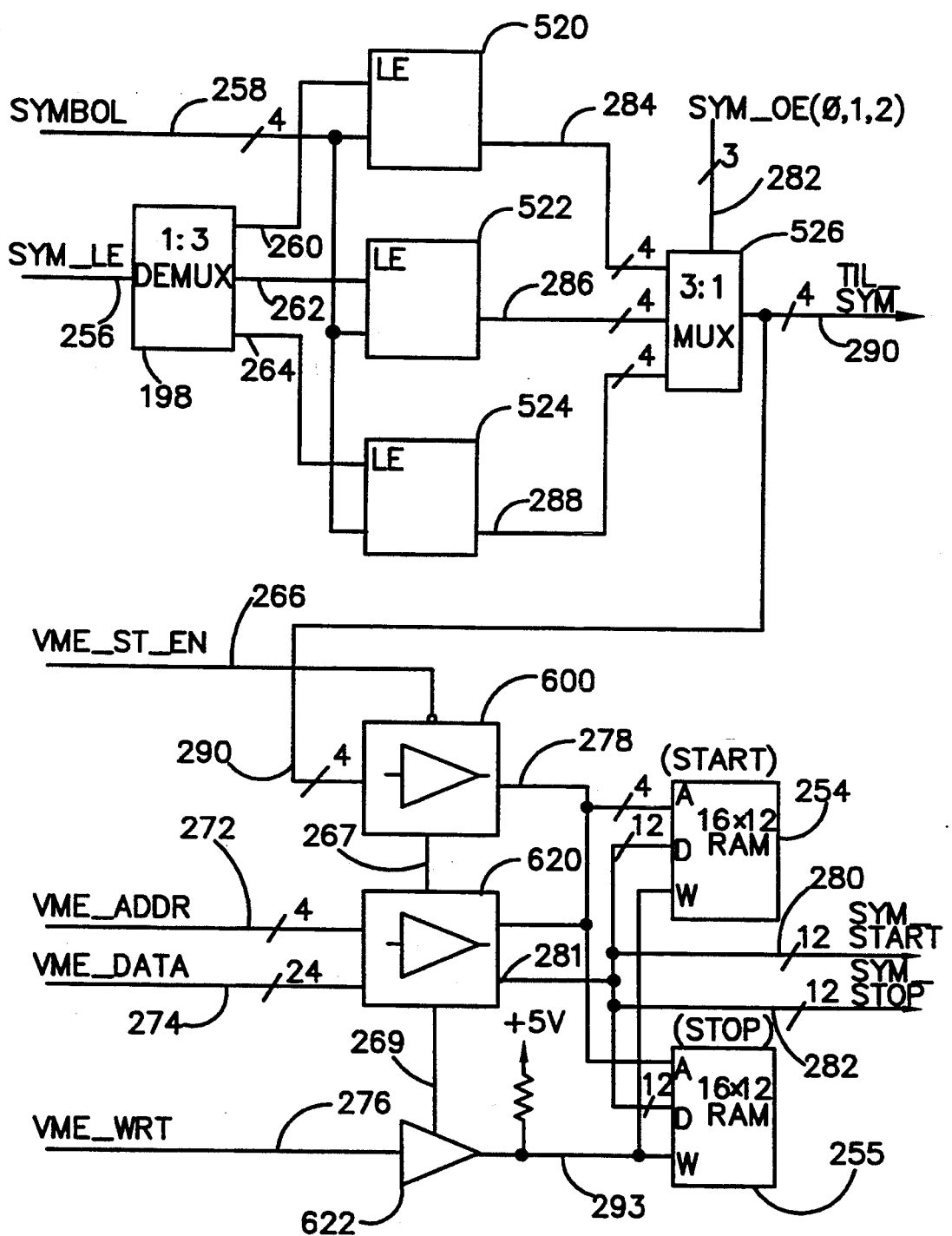
FIG. 11 is a more detailed block diagram which schematically illustrates the object RAM employed in one embodiment of the invention.

Referring now to FIG. 11, a more detailed block diagram schematically illustrating the object RAM START/STOP section employed in one embodiment of the invention is shown. Included in C the object START/STOP random access memory are a demultiplexer 198, first, second and third registers 520, 522 and 524, multiplexer 526, first and second RAM access memory 254 and 255, and input buffers 600, 620 and 622. Demultiplexer 198 receiver signal SYMLE from the VME bus on line 256. Demultiplexer 198 has a first output 260 which it presents to the LE input of register 520. Demultiplexer 198 has a second output at line 262 which is presented to the LE input of register 522 and a third output at 264 presented to the LE input of register 246. Registers 520, 522 and 524 receive a SYMBOL signal, which is, for example, a four bit signal, on their second inputs. Register 520 has an output at line 284 which is correspondingly a 4-bit output which is presented to the multiplexer 526. Note that, since three lines at a time are being processed in this example embodiment, it is preferable that the demultiplexer and multiplexer have ratios of 1:3 and 3:1, respectively. In a similar fashion, multiplexer 526 receives outputs 286 and 288 from the second and third registers 244 and 524. Multiplexer 526 has an enable input 292 for receiving the signal SYMOE(0,1,2), which is advantageously a 3-bit code. Multiplexer 526 outputs the signal TILSYM on line 290 to the PTE state machine 110. The START and STOP signals are controlled by the buffers 600, 620, and 622 and the first and Second RAMs 254 and 255. Buffer 248 receives enable signal BMESTEN on line 266, which is also passed through on lines 267 and 269 to buffers 620 and 622. The TILSYM signal from multiplexer 526 is received by buffer 600 at a second input. Buffer 622 receives address data signal VMEADDR on line 72 and data information on line 274 from signal VMEDATA. These are, for example, 4-bit and 24-bit signals in the illustrative embodiment. Right enable signal VMEWRT* is presented on line 276 to buffer 622 and is further connected by line 293 to the write enable inputs, W, of the first and second RAMs 254 and 255. The VME data is fed through line 281 to the RAMs. The 4-bit address data for the VME ADDR signal and the TILSYM signal are presented to the first and second RAMs through conductors 278. The circuit outputs symbol start signal SYMSTART on line 280 and symbol stop signal SYMSTOP on line 282.

Figure 12A:
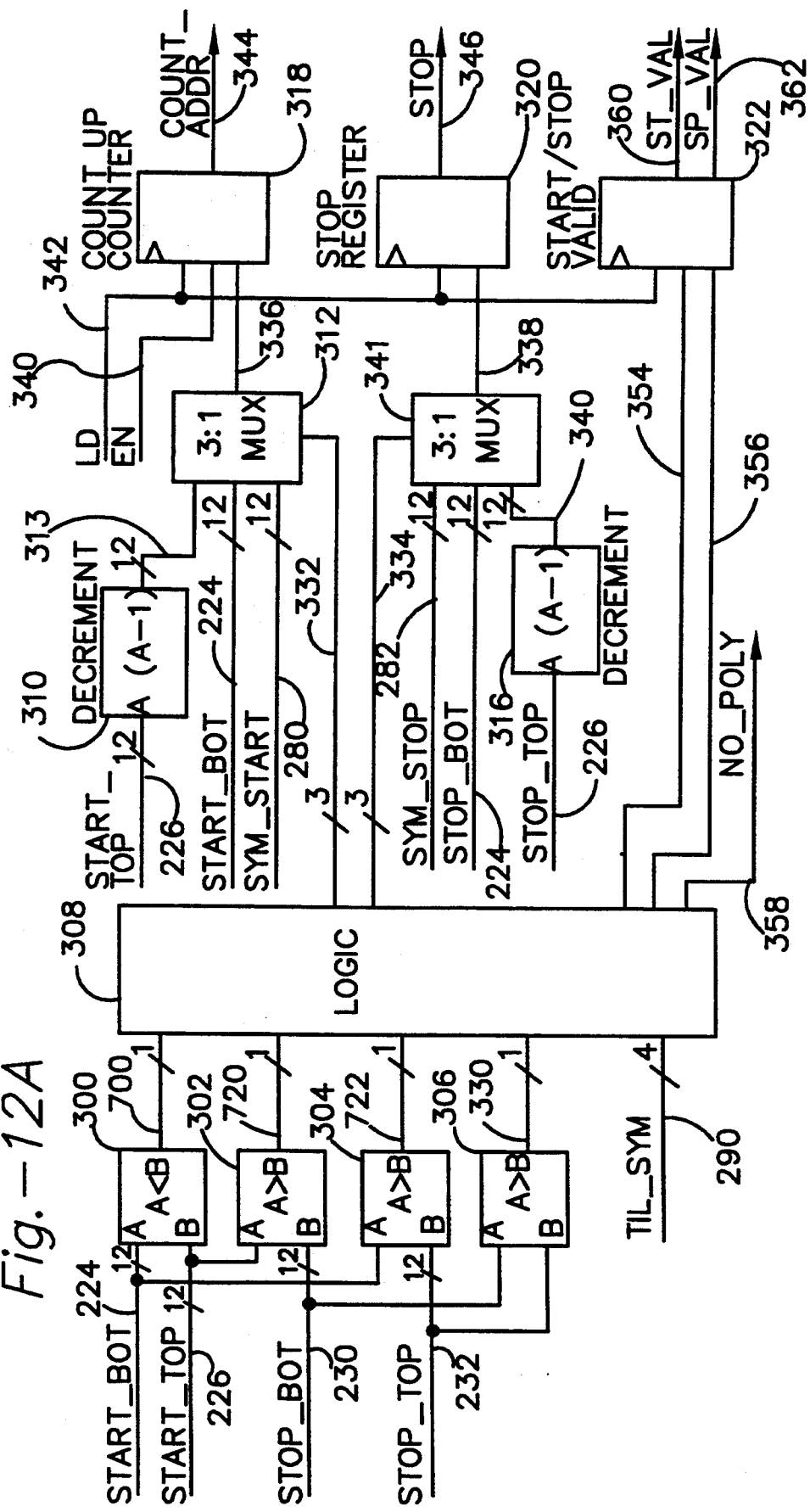
FIGS. 12A and 12B are intended to be considered together as a single drawing to form a more detailed diagram of the START/STOP ADDRESS registers as used in one embodiment of the invention.
Figure 12B:
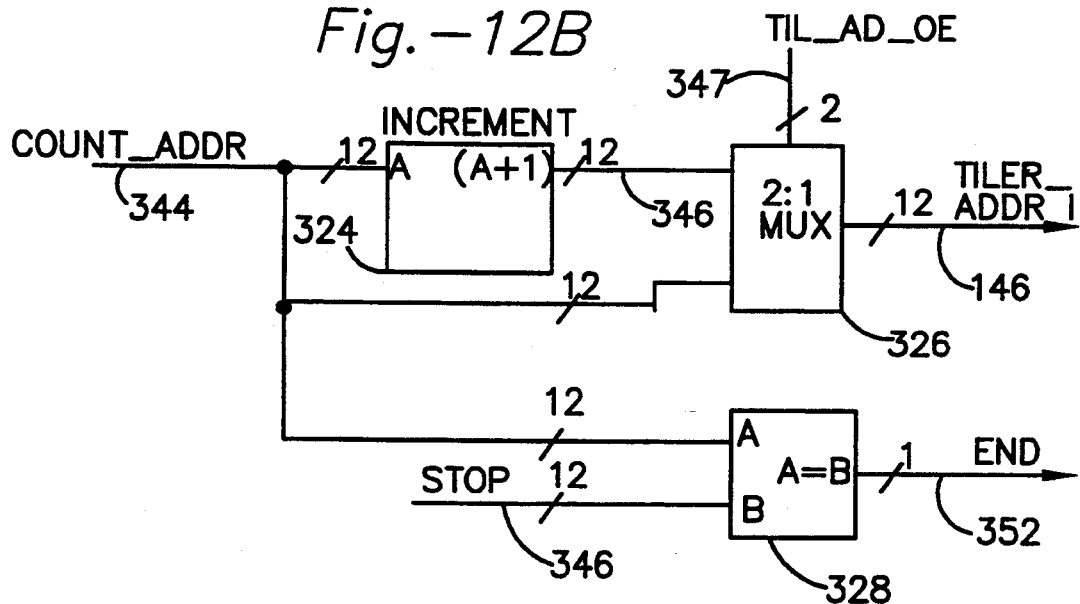

Referring now to FIGS. 12A and 12B which show a more detailed diagram of the START/STOP address registers included in string START/STOP detection means 102 including first through 4th comparators 300, 302, 304, and 306, logic means 308, first and second decrement counters 310 and 316, first and second multiplexers 312 and 314, up counter 318, stop register 320, validation register 322, increment counter 324, fifth comparator 328 and third multiplexer 326. Each of the comparators has a first input A and a second input B.

Comparator 300 checks whether the A input is less than the B output and outputs a corresponding signal on line 200 to logic means 308. Comparator 300 receives the signal STARTBOT on the A input and the signal STARTTOP on the B input. Comparator 302 determines whether its A input is greater than its B input and receives the signal STARTTOP at its A input and the signal STARTBOT at its B input. It outputs a corresponding signal on line 326. Comparator 304 compares the signal START BOT on its A input to the signal STOPTOP on its B input and verifies whether its A input is greater than its B input and outputs a corresponding signal on line 722 to the logic means 308. Comparator 306 receives the signal STOPBOT on its A input and STOPTOP on its B input. It verifies whether its A input is less than its B input and outputs a corresponding signal to logic means 308 on line 330. Logic means 308 also receives signal TILSYM as, for example, a 4-bit signal on a 5th input on line 290. Logic means 308 operates in a conventional fashion to provide appropriate START and STOP signals downstream as well as a signal NOPOLY on output line 358 which informs the PTE if no polygon is to be generated. A first 3-bit output on line 332 is presented to multiplexer 312 which is preferably a 3-to-1 multiplexer, for example. Multiplexer 312 also accepts signals STARTBOT and SYMSTART from lines 224 and 280, respectively.

Multiplexer 312 further receives a signal on line 313 from counter 310 which decrements the STARTTOP signal and outputs the decremented value on line 313 to multiplexer 312. Multiplexer 312 then outputs one of the three input signals at a time on line 336 to the counter 318. Counter 318 has a first enable input tied to line 340 which carries signal EN and a second enable input tied to enable line 342 which carries signal LD. A second three bit output from logic means 308 is supplied on line 334 as decoding logic for multiplexer 314. Multiplexer 314 outputs one of the three signals according to the decoding logic supplied on line 334 onto line 338 into STOP register 320. Inputs to multiplexer 314 include SYMSTOP, STOPBOT and STOPTOP as decremented by counter 316 on line 340. STOP register 320 then supplies the appropriate STOP signal on line 346. Logic means 308 also supplies validation signals on lines 354 and 356 to start and stop valid register 322 which outputs signals STVAL on line 360 and SP VAL on line 362. The count address on line 334 is presented to increment means 324 on line 344, directly to multiplexer 326 and to the A input of comparator 328. Multiplexer 326 receives the incremented COUNTADDR value on line 346 and, in response to the enable code received on line 347, labeled TILADOE outputs one of the two signals on line 350 labeled TILRRADDR1. Comparator 328 verifies whether its A input is equal to its B input STOP and outputs an appropriate signal on line 352 labeled END.

Figure 13:
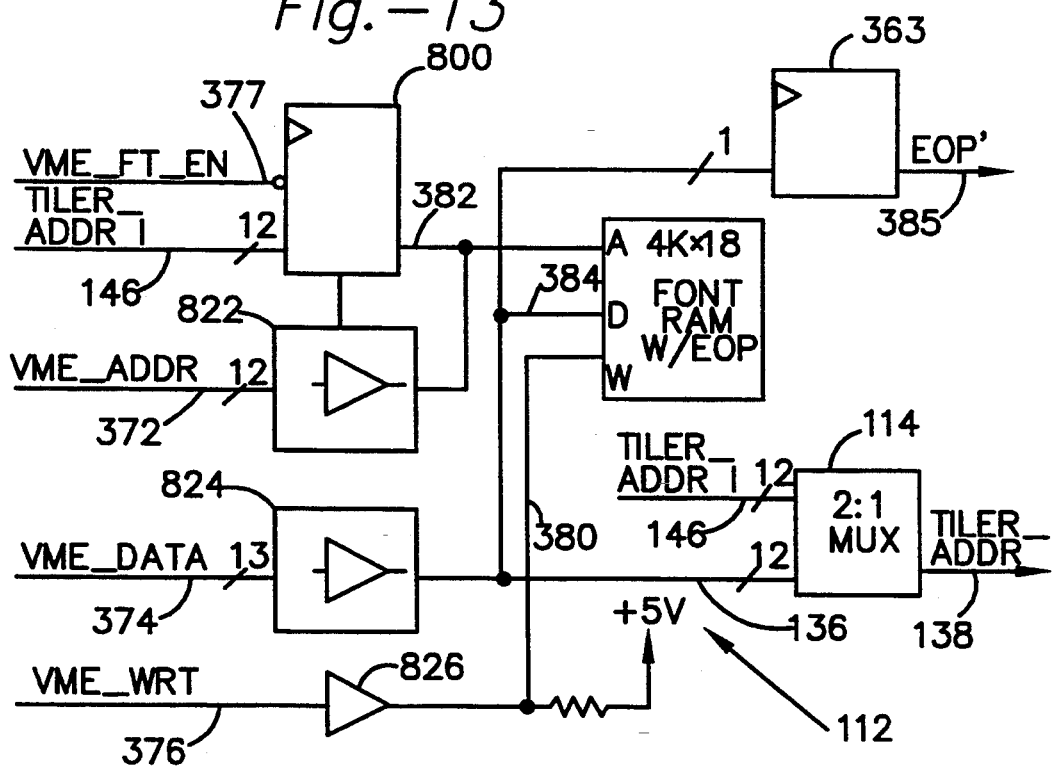
FIG. 13 is a more detailed block diagram of the LINK LIST RAM as employed in one embodiment of the invention.

Referring now to FIG. 13, a more detailed block diagram of the link list RAM 112 as employed in one embodiment of the invention is shown. Link list RAM 112 comprises a first register 800, a second register 363, first, second and third buffers 922, 824, and 826, multiplexer 370 and font RAM 368. The first register 800 receives signal VMEFTEN on a first input line 377 and signal TILERADDR1 on a second input line 350. Buffer 822 receives the signal VMEADDR on line 372. The second buffer 364 receives signal VMEDATA 374 and a third buffer 366 receives the control signal VMEWRT on line 376 which is presented on line 380 to the write enable input W of font 368. The output of register 800 and buffer 822 intersect at node 382 and are presented to the address input A of font RAM 368. Font RAM 368 is advantageously a 4K by 18-bit RAM as used in one embodiment of the invention. The data input D of font RAM 368 receives the output of buffer 364 which comprises the VMEDATA signal. At node 384 a single bit representing the EOP' signal is presented to the input of register 363 which then outputs EOP' when enabled on line 385. Multiplexer 114 is advantageously a 2:1 multiplexer which switches between the output on line 136 and the TILERADDR1 signal on line 146 to supply the signal TILERADDR on line 138.

Figure 14:
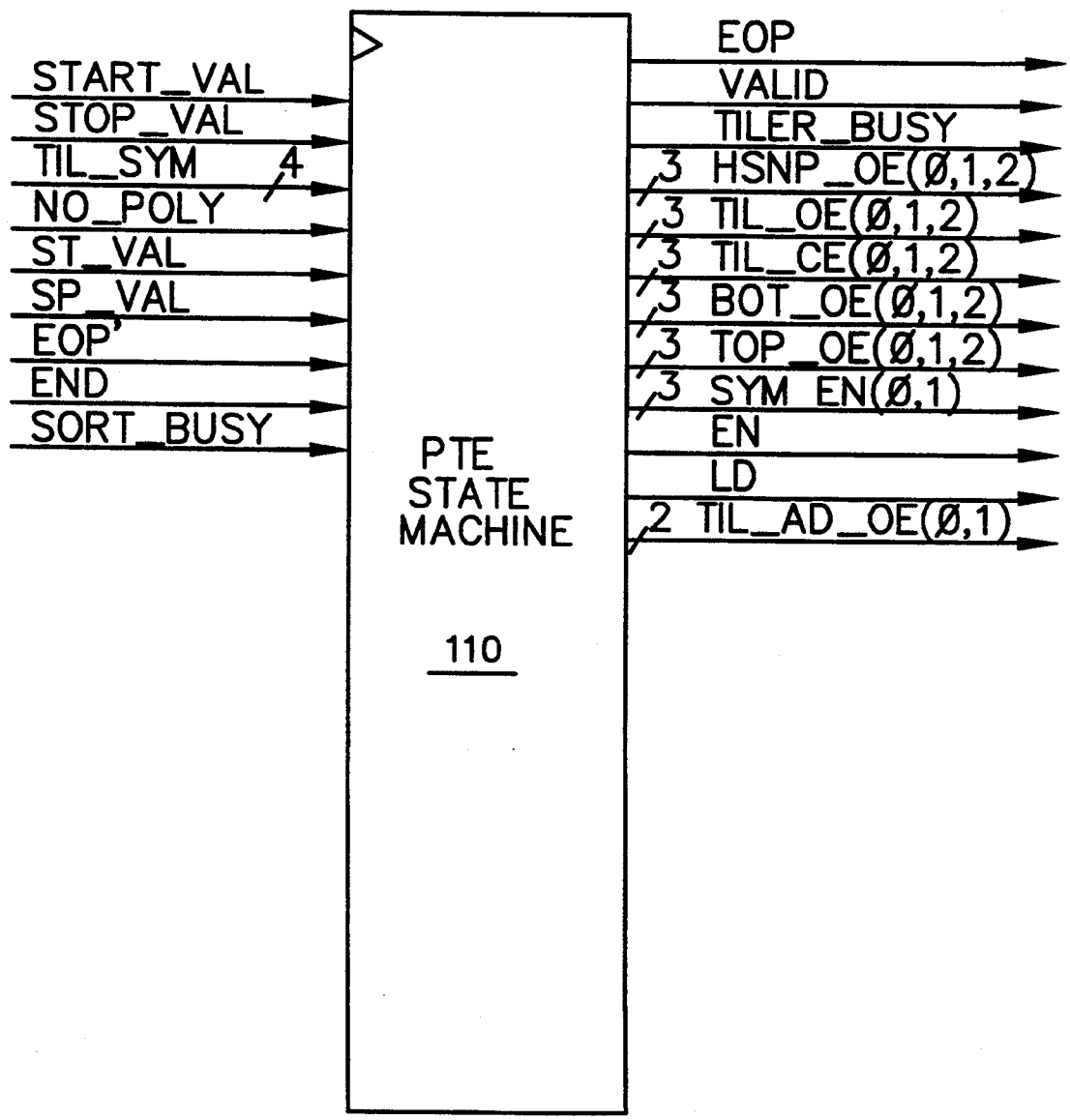
FIG. 14 shows the input and output signals used in the tiler state machine as employed in one embodiment of the invention.

Now referring to FIG. 14, a more detailed view of the PTE state machine 110 is shown including its respective inputs and outputs.

The inputs to the PTE state machine may be defined as follows:

STARTVAL and STOPVAL are external validation inputs from the High Speed Numerical Processor as indicated below with respect to FIG. 15. As indicated by their names they signal the PTE state machine when a valid starting vertex or valid stopping vertex is being input as data.

TILSYM is a four bit signal generated in response to the instruction bits SYMBOL as shown in FIG. 11 and discussed hereinabove with respect to FIG. 2 and, like SYMBOL is an internal instruction which designates the type of polygon being generated. Since, in this example, TILSYM is 4 bits, the number of types of polygons is 16.

NOPOLY is discussed hereinabove with reference to FIGS. 12A and 12B. When active, NOPOLY signals the PTE that "no polygon" is being input as data as when the loaded vertexes are all at a single point.

STVAL and SPVAL are generated as shown in FIG. 12A are internal start and stop valid signals from the start and stop valid register 322 in response to validation signals 354 and 356 as discussed hereinabove. Those skilled in the art will appreciate that these will be "true" if the start and stop addresses are valid addresses.

EOP' as discussed hereinabove with reference to FIG. 13, is a bit used to signal the End of Polygon when the polygon is read from FONT RAM W/EOP 368.

END signals the End of Polygon if the polygon is not a predefined object in link list RAM.

SORTBUSY is a busy signal from the polygon sort engine 100. The use of busy signals is well known.

Figure 15:
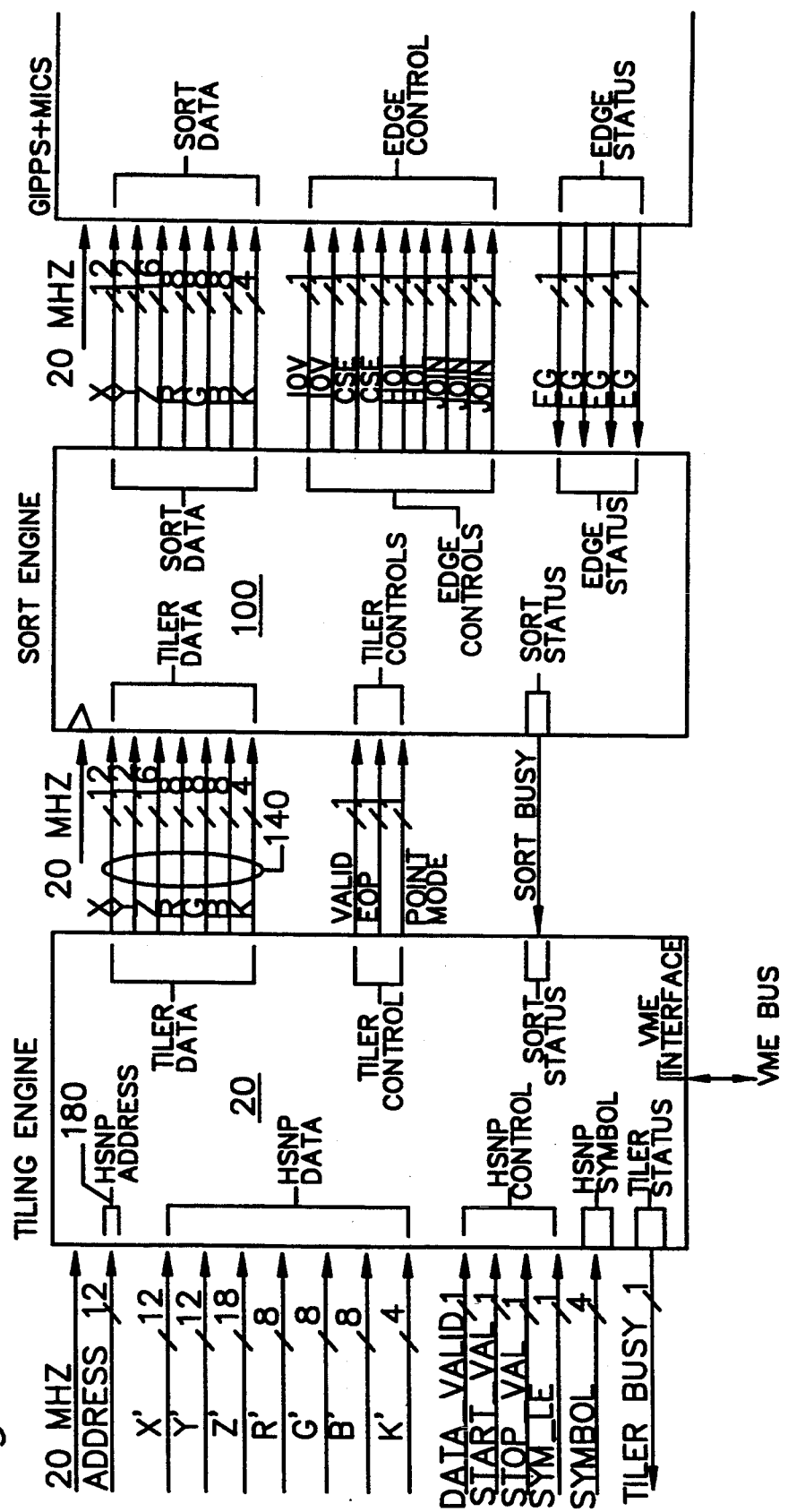
FIG. 15 is a diagram of the interface between the Polygon Tiling Engine of the invention and a Polygon Sort Engine.

The outputs from the PTE state machine may be defined as follows:

EOP signals "End of Polygon" to the sort engine as shown in FIG. 15 in response to either the EOP' input or the END input.

VALID as shown also in FIG. 15 signals the sort engine that valid data is being presented and is generated in response to the validation inputs STARTVAL, STOPVAL, STVAL and SPVAL in a well known manner.

TILERBUSY is a busy signal from the tiling engine to the previous stage as shown in FIG. 15, which is active when the tiler is processing data and is too busy to receive more inputs.

HSNPCE(0,1,2) are three single bit signals to each section of the triple buffered memory shown in FIG. 9. As shown in FIG. 9, this signal enables registers 160 and 162 in a well known manner.

TIL-OE(0,1,2) are three single bit signals to each section of the triple buffered memory shown in FIG. 9. As shown in FIG. 9, this signal enables register 164 in a well known manner.

TIL-CE(0,1,2) are three single bit signals to each section of the triple buffered memory shown in FIG. 9. As shown in FIG. 9, this signal enables register 174 in a well known manner.

BOTOE(0,1,2) is a three bit signal to multiplexer 212 in FIG. 10 which enables the multiplexer to output the STARTBOT signal for the bottom line of vertexes in a well known manner.

TOPOE(0,1,2) is a three bit signal to multiplexer 218 in FIG. 10 which enables the multiplexer to output the STARTTOP signal for the top line of vertexes in a well known manner.

SYMOE(0,1,2) is a three bit signal to multiplexer 526 in FIG. 11 which enables the multiplexer to output the TIL,SYM signal in a well known manner upon power up.

TILADOE (0,1) is a two bit signal to multiplexer 326 in FIG. 12B which enables the multiplexer to output the polygon addresses in a well known manner after power up. As is shown in FIGS. 5 and 8 discussed hereinabove TILADOE0 is enabled when outputting a first line vertex address and TILADOE1 is enabled when outputting a second line vertex address.

LD is a load enable signal to the count up counter 318, stop register 320 and start/stop valid register 322 of FIG. 12A. LD is a well known abbreviation for "load" and is activated when data is being loaded into the tiler. EN is simply an enable signal to the count up counter 318 which is enabled when the counter is ready to output a count address COUNTAIDDR.

Referring now to FIG. 15, a diagram of the interface between the polygon tiling engine 20 of the invention and the polygon sort engine as used in one application of a graphics pipeline is shown. Inputs to the polygon tiling engine include a clock input on line 400, address input 402, and X', Y', Z', R', G', B', and K' inputs which represent data inputs to the tiler engine. Validation inputs including DATA VALID, STARTVAL, STOPVAL, SYMLE and symbol control signal SYMBOL. Outputs of tiler data include X, Y, Z, R, G, B and K. Control signals include VALID, EOP and POINTMODE. Status input sort status which indicates whether the sort engine is busy and tiler status output TILERBUSY. The tiling engine also includes a VME interface to the VME bus. The clock used in the illustrative example described herein is advantageously a 20 MHz clock. Addresses are advantageously 12-bits long as are the X and Y values. Z values are 16 bits, R, G, and B values are carried as 8-bit strings. The K factor is carried as a 4-bit word as is SYMBOL. Control lines are 1 bit in most cases.

Figure 16:
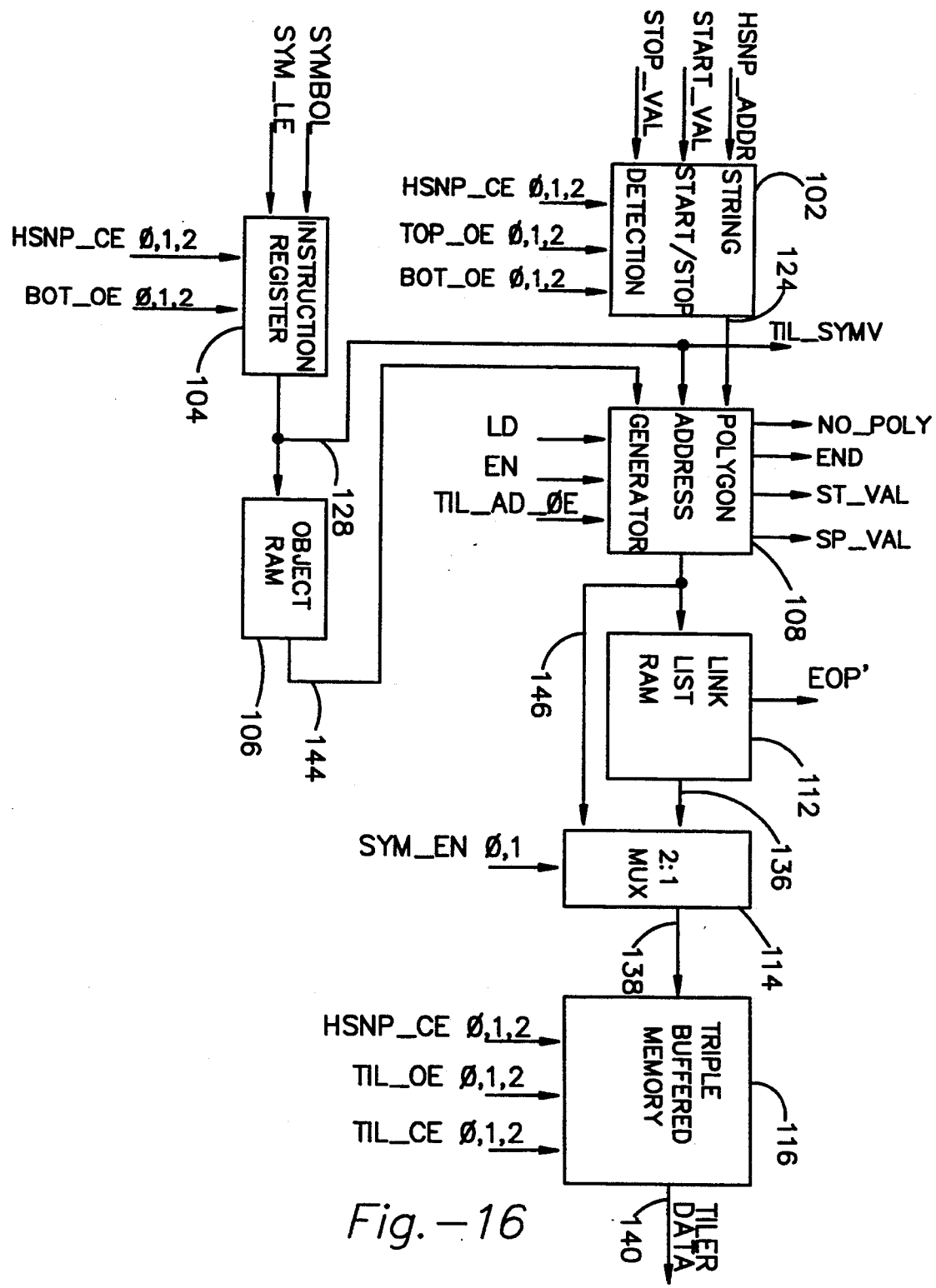
FIG. 16 shows a schematic block diagram of the method of the invention used to generate tiler data among other signals.

Now referring to FIG. 16 which shows a schematic diagram of the apparatus of the invention used to provide tiler data. The START/STOP detection apparatus 102 is provided with the HSNPADDR signal, the STARTVAL signal, the STOPVAL signal, the HSNP CE(0,1,2) signal, the TOPOE(0,1,2) signal, and the BOTOE(0,1,2) signal. The START/STOP detection apparatus 102 is shown in more detail with reference to FIG. 10. The START/STOP detection apparatus 102 provides a START/STOP signal 124 to the polygon address generator 108.

The polygon address generator 108 is described in detail with reference to FIG. 12. The polygon address generator accepts the load signal LD, the enable signal EN and the TILADOE signal and provides the NOPOLY signal, the END signal, the start valid STVAL signal and the stop valid SPVAL signal. The polygon address generator provides polygon addresses on line 146 to the LINK LIST RAM 112 which is described in more detail with reference to FIG. 13. The polygon addresses are also provided to a 2 to 1 MUX 114 shown in more detail in FIG. 13. The LINK LIST RAM outputs the end of polygon prime signal EOP' as well as a LINK LIST of polygons to the 2 to 1 MUX 114. The 2 to 1 MUX 114 provides the polygons to the triple-buffered memory 116 described in more detail with reference to FIG. 9. The triple-buffered memory also is provided with the HSNPCE(0,1,2) signal and the TILOE(0,1,2) signal and the TIL CE(0,1,2) signal. The triple-buffered memory provides tiler data 140. The polygon address generator 108 also accepts other signals. An instruction register 104 defined in detail with reference to FIG. 11 receives a SYMBOL signal and a SYMLE signal from the HSNP. The instruction register 104 also accepts the HSNPCE(0,1,2) signal and the BOTOE(0,1,2) signal. The instruction register 104 provides the TILSYM signal to the polygon address generator 108 in the object RAM 106. The object RAM 106 provides an address on line 144 to the polygon address generator 108.

Figure 17:
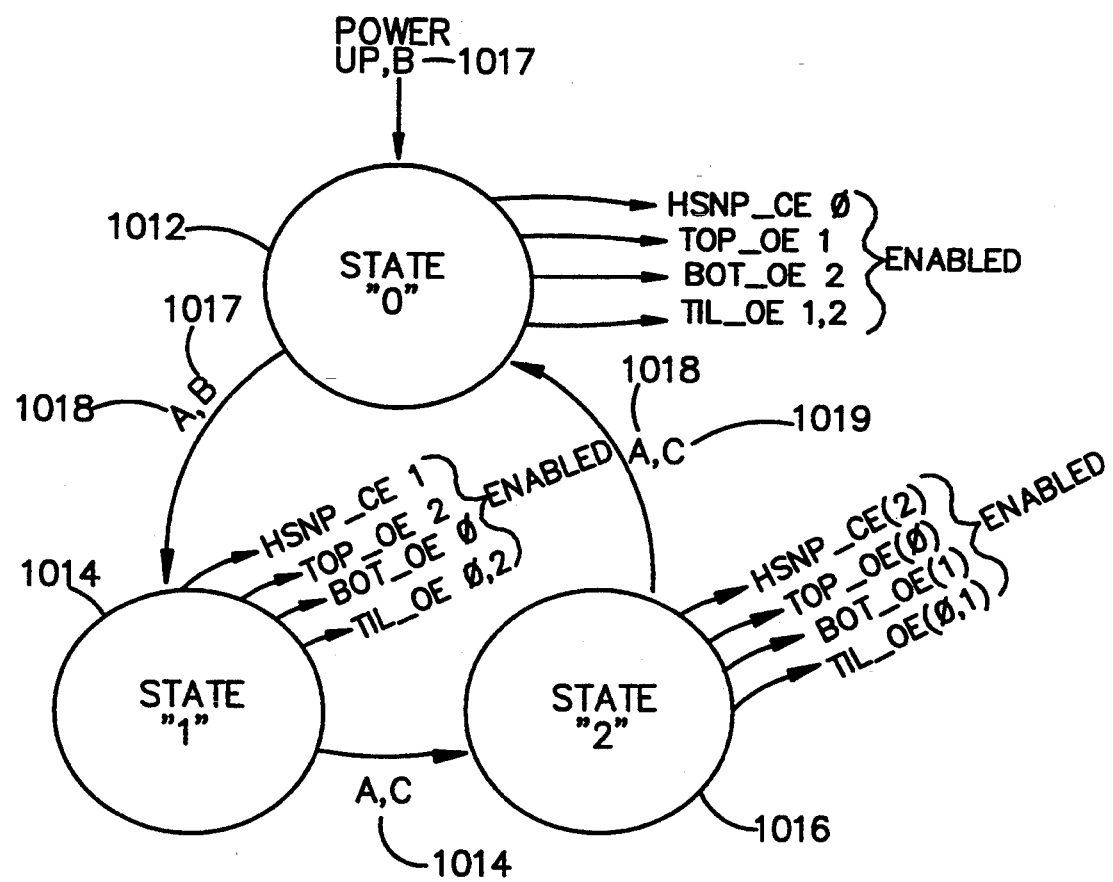
FIG. 17 shows a state diagram of the method of the invention.

Now referring to FIG. 17 which shows a state transition diagram for the state machine of the method of the invention. The state machine starts in a POWER UP state 104 which is provided with an internal POWER UP signal B 1017. The internal POWER UP signal B signals the state machine when the system is in a power up state. The system can be also in transition state A when the following signals are active: STARTVAL, STOPVAL, SYMLE, END or EOP' and the SORT BUSY signal is false. If the system makes a state transition from state ZERO ("0") 104 to state ONE ("1") 106 the output of the state machine provides the following signals as enabled: HSNP CE1, TOPOE2, BOTOE0, and TILOE0,2. The transition from state ZERO ("0") 104 to state ONE ("1") 106 occurs when the transition state A occurs. The transition from the state ONE ("1") 106 to state TWO 1016 occurs also when state A occurs, but in the interim other machines in the apparatus of the invention will change the state of STARTVAL, STOPVAL, SIMLE, and EOP', as well as SORT BUSY. The transition from state ONE ("1") 106 to state TWO ("2") 1016 occurs on the same transition as state ZERO ("0") 104 to state ONE ("1") 106, however, the output of the state machine at state TWO ("2") 1016 is different from state ONE ("1") 106. In state TWO ("2") 1016 the following signals are indicated as enabled: HSNPCE(2), TOPOE(0), BOTOE(1) and TILOE(0,1). The state machine can make the transition from state TWO ("2") 1016 to state ZERO ("0") 104, however, at this point the POWER UP state now indicates a non powered up state C 1019. The transition from state TWO ("2") 1016 to state ZERO ("0") 104 occurs at transition state A, however, the output of the state machine at state ZERO ("0") 104 is different. At state ZERO ("0") the output of the state machine provides HSNPCEO, TOPOE1, BOTOE2, and TILOE1,2 as enabled. The POWER UP state enables the tiling engine to fill up the tiling pipeline with enough information to provide at least one polygon.

Figure 18:
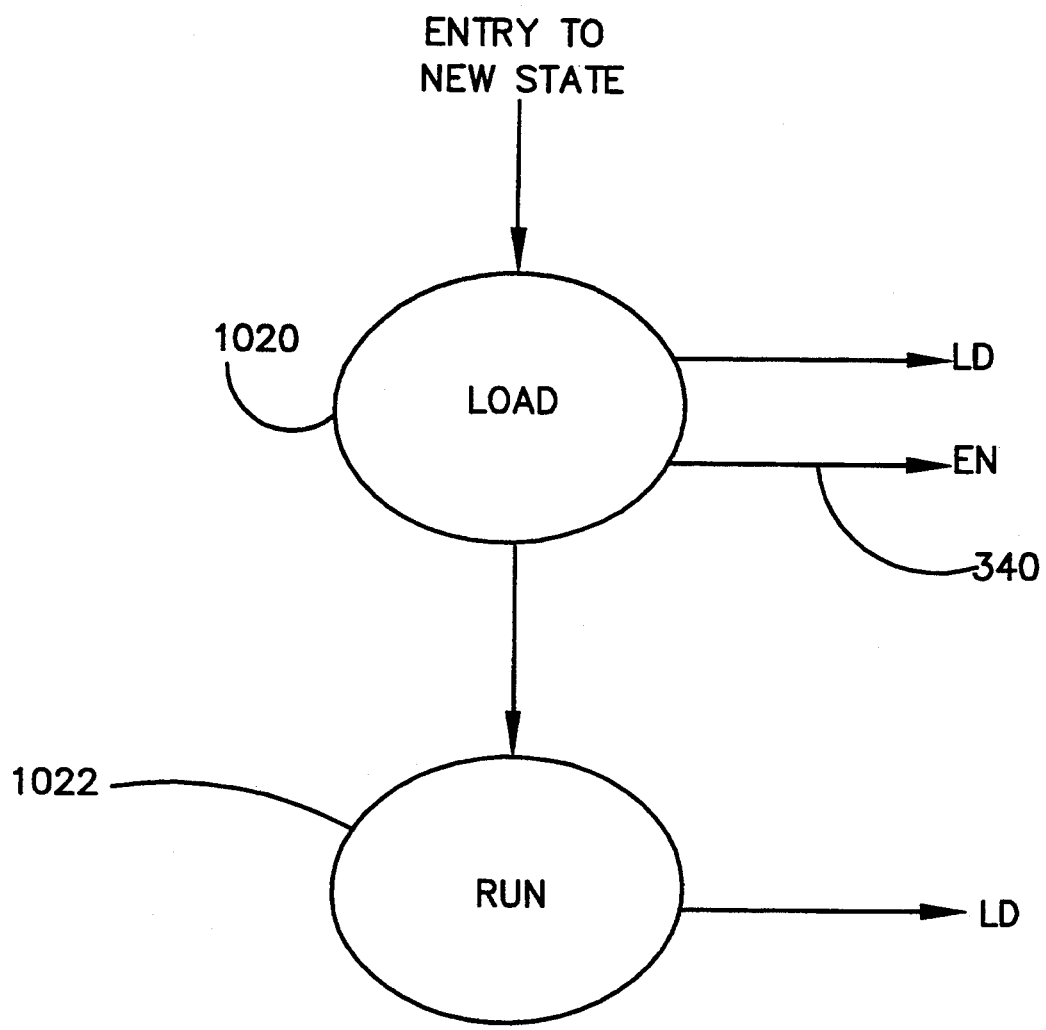
FIG. 18 shows a load run state diagram of the method of the invention.

Now refer to FIG. 18 which provides a more detailed look at each state. Each state in the state transition diagram of FIG. 17 has two sub-states: the LOAD state 1020 and the RUN state 1022. During the LOAD state, the LD signal is enabled and the EN signal 340 is disabled. When making a transition from the LOAD state 1020 to the RUN state 1022, the LD signal is disabled and other signals are enabled or disabled depending on other sub sub-states. The other sub sub-states are defined with reference to FIGS. 19A and 19B.

Figure 19A:
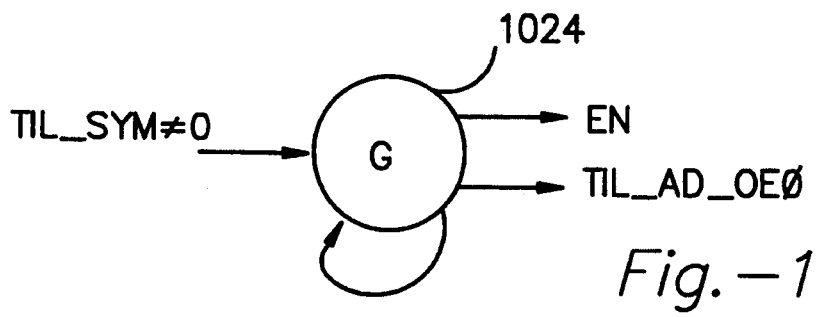
FIG. 19A shows a state diagram of the method of the invention.

Now refer to FIG. 19A which shows sub-states. In the RUN state there are seven sub-states A–G in which the system can operate. The TILSIM signal determines whether or not terrain data or other types of data are being fed to the polygon address generator. "Terrain" data indicates that the predetermined terrain writing profile will be used. If specific user defined objects, such as, for example, a house, or if other types of data such as N vertex polygon data as may be used for lakes, for example, are being provided, then each shape will be specifically defined. The G state is defined in FIG. 19A as having its input as TILSIM not zero which indicates that the tiling machine is not processing terrain data, but may be processing other data such as user object data or N vertex polygon data. In state G the output of the state machine provides EN as enabled and TILADOE0 signal as enabled. This state loops on itself until such time that the input state is zero.

Figure 19B:
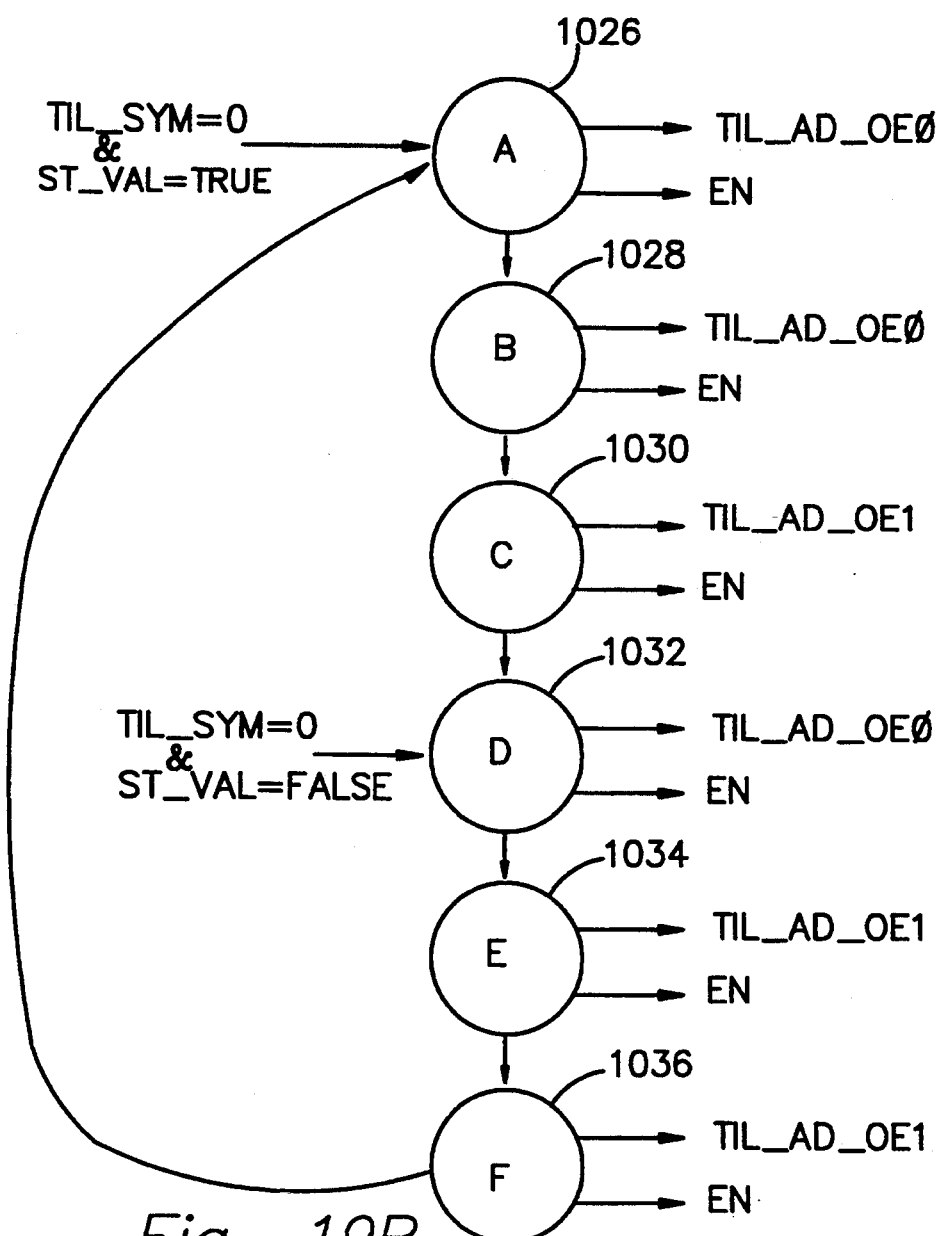
FIG. 19B shows another state diagram of the method of the invention.

Now referring to FIG. 19B which shows the remaining states in the sub sub-state of the sub-state RUN. The input to the A state 1026 is TILSYM=zero and STVAL=true. The output of the state A is TILADOE0 enabled and the EN signal disabled. The system then does a transition from state A to state B according to Table A. If the system makes a transition to state B 1028, then the TILADOE0 signal is enabled and the enable signal EN is disabled. The system checks the logic of Table A and makes the appropriate signal active. The system makes similar state transitions from B 1028-C 1030, from C 1030-D 1032, from D 1032-E 1034, from E 1034-F 1036, and from F 1036-A 1026 enabling or disabling the indicated signals. The EN signal is disabled for states A through E and enabled for states F and G. TILADOE0 is enabled for states A, B, D, and G. TILADOE1 is enabled for states C, E, and F. The net result is to provide terrain tiling data to the tiling engine. TILADOE0 is the base address and TILADOE1 is the incremental address. The enable signal EN is used for loading counter 318 shown in FIG. 12A.

The following tables illustrate the logic used in one preferred embodiment of the invention to generate the control signals disclosed above with reference to logic 308 shown in FIG. 12A.

TABLE A - Logic for generating TIL_CE(0,1,2).
If (TIL_SYM $\neq$ 0)
    TIL_CE(0, 1,2) = TIL_OE(0,1,2)
ELSE
    IF (STATE A, D, E)
        If (TIL_OE0 = enabled)
            TIL_CE2 enabled
        Else if (TIL_OE1 = enabled)
            TIL_CE0 enabled
        Else (TIL_OE2 = enabled)
            TIL_CE1 enabled
    Else if (STATE B, C, F)
        If (TIL_OE0 = enabled)
            TIL_CE1 enabled
        Else if (TIL_OE1 = enabled)
            TIL_CE2 enabled
        Else (TIL_OE2 = enabled)
            TIL_OE0 enabled TABLE B - Logic for generating END OF POLYGON (EOP).
If [((END = = TRUE) _ (TIL_SYM = = 0)) or
    ((EOP' = = TRUE) _ (TIL_SYM $\neq$ 0))]
        EOP = TRUE
Else EOP = FALSE TABLE C - Logic for generating VALID. (When VALID is true DATA is now VALID and should be collected by the next machine.)
If (EOP = = TRUE)
    set VALID FALSE
Else if ((LD enabled) _ (NO_POLY = = FALSE))
    set VALID TRUE TABLE D - Logic for generating Start Counter on line 332 shown in FIG. 12A.
If (TIL_SYM $\neq$ 0)
    select SYM_START address to be loaded into count up counter
Else if [(START_BOT < START_TOP)]
    decrement START_TOP address by 1 and select it to be loaded into the count up counter
Else
    select START_BOT address to be loaded into the count up counter TABLE E - Logic for generating Stop Control on line 334 shown in Figure 12A.
If (TIL_SYM $\neq$ 0)
    select SYM_STOP address to be loaded into the stop register
Else if (STOP_TOP $\leq$ STOP_BOT)
    decrement STOP_TOP address by 1 and select it to be loaded into the stop register
Else
    select STOP_BOT address to be loaded into the stop register TABLE F - Logic for generating NO-POLY signal on line 358 as shown in FIG. 12A.
NO_POLY = FALSE
If [(START_TOP > STOP_BOT) or
(START_BOT > STOP_TOP)] and (TIL_SYM = = 0)]
    set NO_POLY = TRUE TABLE G - Logic for generating signal on line 354 shown in Figure 12A.
ST_VAL = FALSE
If ((TIL_SYM $\neq$ 0) or
    [(START_BOT $\geq$ START_TOP) _ (TIL_SYM = = 0)]
        set ST_VAL = TRUE TABLE H - Logic for generating signal on line 356 shown in Figure 12A.
SP_VAL - FALSE

| |
|---|
| -continued |
| If ((TIL_SYM ≠ 0) or [(STOP_BOT ≧ STOP_TOP) and (TIL_SYM = = 0)] set SP_VAL = TRUE |

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. In a computer graphics display system, wherein the system includes a high speed processor which provides a plurality of vertex points and a symbol code, an improved apparatus for tiling polygons comprising:

a. logic means coupled to receive the symbol code, said logic means generating a symbol type signal in response to the symbol code;

b. start/stop detection means operably connected to the high speed processor for receiving said plurality of vertex points and providing start and stop signals in response to said plurality of vertex points which mark starting and ending addresses for a polygon being tilted;

c. means for storing user defined objects coupled to receive the symbol type signal at a first input, said storing means having a user defined object address output which is activated if the symbol type signal is representative of a user defined object;

d. means for generating polygon addresses comprising a first input coupled to receive the symbol type signal, a second input coupled to receive the start and stop signals, and a third input coupled to said user defined object address output, said polygon address generating means generating polygon addresses in response to the first, second and third inputs and outputting the polygon addresses through a polygon address output;

e. storage means for constructing a list of points for user defined objects, said storage means having an input connected to said polygon address output of said polygon address generating means, said storage means providing an end-of-polygon bit at the end of each face of a user defined polygon as constructed in the list of points at a linked list output, said storage means further providing user defined polygon addresses at said linked list output;

f. multiplexing means coupled at a first input to the polygon address output of said polygon address generating means, and at a second input to said linked list output, said multiplexing means further comprising a multiplexed object address output, said multiplexing means controlled in response to said symbol type signal so as to switch through said linked list output if a user defined object is being tiled, until said end-of-polygon bit is encountered otherwise switching through said polygon address output; and g. buffered memory means having a first input coupled to receive the plurality of vertex points from the high speed processor, and coupled at a second input to said multiplexed object address output, said buffered memory means comprising an output which provides a selected sequence of vertex points selected from the plurality of vertex points, the sequence of vertex points being determined by the multiplexed object address output.

2. The apparatus of claim 1 wherein said buffered memory means comprises at least three identical random access memory channels.

3. The apparatus of claim 1 wherein said user defined object storing means comprises a random access memory.

4. The polygon tiling apparatus of claim 1 wherein said means for generating polygon addresses is controlled by a state machine.

5. In a computer graphics display system, wherein the system includes a high speed processor which provides a plurality of vertex points, a symbol code, an improved apparatus for tiling polygons comprising:

a. logic means coupled to receive the symbol code, said logic means generating an object address output;

b. buffered memory means having a first input coupled to receive the plurality of vertex points from the high speed processor and coupled at a second input to the object address output, said buffered memory means having an output which provides a selected sequence of vertex points selected from the plurality of vertex points wherein the sequence is determined by the object address output; and c. said logic means further comprising means for generating object addresses that are in a sequence which provides said buffered memory means with object addresses in a predetermined order which corresponds to digital terrain elevation data.

* * * * *